United States Patent
Enders

(10) Patent No.: US 9,272,681 B1
(45) Date of Patent: Mar. 1, 2016

(54) KNEE AIRBAG DEPLOYABLE FROM A SIDE PANEL

(71) Applicant: Autoliv ASP, Inc., Ogden, UT (US)

(72) Inventor: Mark Ludwig Enders, Pleasant View, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/553,302

(22) Filed: Nov. 25, 2014

(51) Int. Cl.
*B60R 21/231* (2011.01)
*B60R 21/21* (2011.01)

(52) U.S. Cl.
CPC ............... *B60R 21/231* (2013.01); *B60R 21/21* (2013.01); *B60R 21/23138* (2013.01); *B60R 2021/23169* (2013.01)

(58) Field of Classification Search
CPC  B60R 21/231; B60R 21/21; B60R 21/23138; B60R 2021/23169
See application file for complete search history.

(56) References Cited

U.S. PATENT DOCUMENTS

| | | | |
|---|---|---|---|
| 5,439,248 A | 8/1995 | Steffens, Jr. et al. | |
| 5,575,497 A * | 11/1996 | Suyama et al. | 280/730.1 |
| 6,017,059 A * | 1/2000 | Taubenberger et al. | 280/752 |
| 6,217,059 B1 * | 4/2001 | Brown et al. | 280/730.2 |
| 7,997,610 B2 | 8/2011 | Fukawatase et al. | |
| 2004/0155447 A1 * | 8/2004 | Smith et al. | 280/753 |
| 2008/0114516 A1 | 5/2008 | Jackson et al. | |
| 2009/0152848 A1 * | 6/2009 | Sadr et al. | 280/730.2 |
| 2014/0197622 A1 * | 7/2014 | Muraji et al. | 280/730.2 |

* cited by examiner

*Primary Examiner* — Drew Brown
(74) *Attorney, Agent, or Firm* — Stoel Rives LLP

(57) ABSTRACT

A knee airbag can be deployed from a side panel of a vehicle to cushion the lower leg of a vehicle occupant during a collision event. Such knee airbags can provide protection to occupants that move in a forward and outboard direction during a collision event. In some circumstances, the knee airbag includes one or more chambers.

20 Claims, 7 Drawing Sheets

KNEE AIRBAG DEPLOYABLE FROM A SIDE PANEL

TECHNICAL FIELD

The present disclosure relates generally to the field of automotive protective systems. More specifically, the present disclosure relates to inflatable airbags that are configured to deploy from a side panel of a vehicle to cushion the lower leg of an occupant during a collision event.

BACKGROUND

Airbags may be mounted within a vehicle and deployed so as to prevent a vehicle occupant from impact with a vehicular structure during a collision event. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
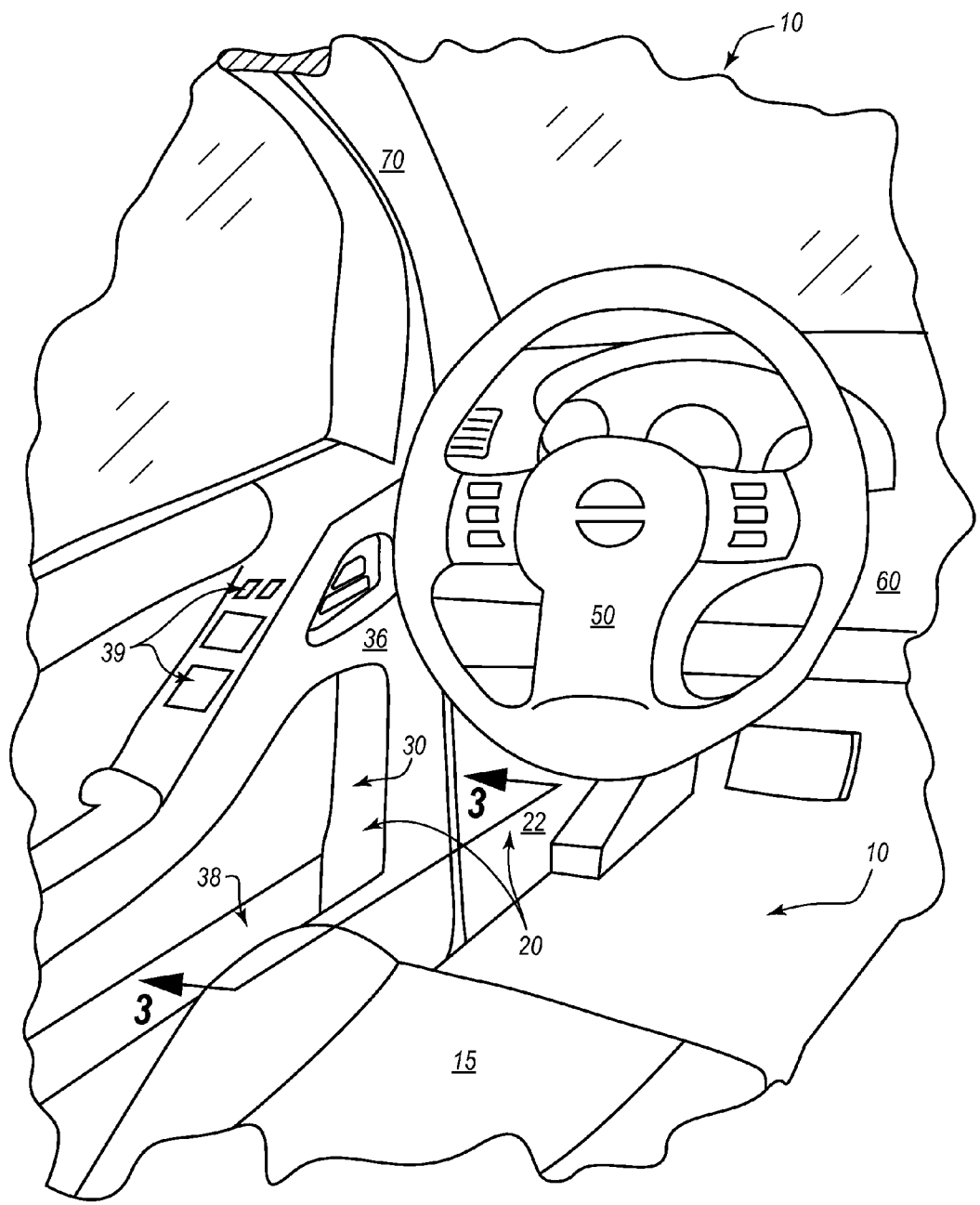
FIG. 1 is a perspective view of a portion of an interior of a vehicle with an airbag assembly in an undeployed state.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrase "coupled to" is used in its ordinary sense, and is broad enough to refer to any suitable coupling or other form of interaction between two or more entities, including mechanical, fluid, and thermal interaction. Two components may be coupled to each other even though they are not in direct contact with each other. The phrases "attached to" or "directly attached to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

As used herein, the directional terms "forward" and "rearward" are expressed in relation to the relevant vehicle. For example, an airbag cushion that deploys in a rearward direction deploys toward the back of the vehicle. As used herein, the term "vehicle occupant position" refers to a position typically occupied by an occupant when seated in a front seat of a vehicle. The term "side panel," as used herein, refers generally to the set of components that form the left and right sides of a vehicle. For example, a side panel of a vehicle may include (1) one or more doors of the vehicle (including various components of the door, such as a door shell, an exterior skin, an interior skin, and an interior trim) and (2) the frame along the right and left sides of the vehicle (along with any interior trim attached thereto). The term "lower leg," as used herein, refers to the portion of the body at or below the knee. Thus, an airbag that is configured to cushion a lower leg of a vehicle occupant may be configured to cushion one or more of a knee, shin, or foot of the occupant during a collision event. The "geometric center" of an object (e.g., an airbag cushion) is the mean position of all points within the object. As used herein, "A-pillar" refers to the portion of a vehicle frame that is disposed immediately forward of a front door of a vehicle. The A-pillar includes not only the portion of the frame disposed directly forward of the window, but also the portion of the vehicle frame disposed forward of lower parts of the door as well.

Inflatable airbag systems may be installed at various locations within a vehicle to reduce or minimize occupant injury during a collision event. For example, among other locations, airbag modules have been installed in steering wheels and dashboards. In the following disclosure, specific reference is made to airbags to be deployed from a side panel of a vehicle, such as a side door or from a location forward of a front side door. However, the principles discussed herein may apply to airbags that are disposed at and/or deployable from other locations within a vehicle.

Airbags are typically installed within a housing in a packaged state (e.g., rolled, folded, and/or otherwise compressed) and may be retained in the packaged state behind a cover. During a collision event, an inflator may be triggered, which rapidly fills an airbag with inflation gas. The inflation gas may cause the airbag to rapidly transition from a compact packaged (i.e., undeployed) state to an expanded or deployed state. In some embodiments, the expanding airbag opens an airbag cover (e.g., by tearing through a tear seam or opening a door-like structure) to exit the housing. The inflator may be triggered by any suitable device or system, and the triggering may be in response to and/or influenced by one or more vehicle sensors.

During a collision event, one or more knee airbags may deploy to protect the lower leg of a front-seat occupant. The one or more knee airbags may deploy from any suitable location. For example, knee airbags commonly deploy in a generally downward direction from a steering column or dashboard. In some instances, however, a single knee airbag that deploys from a steering column or dashboard may not provide effective coverage for a front-seat occupant who follows a forward and outboard trajectory during the collision event. Disclosed herein are embodiments of knee airbags that deploy from the side panel of a vehicle (e.g., from a side door or from the side region of a vehicle disposed forward of a front side door) to protect one or more lower legs of a vehicle occupant during such a collision event. For example, an airbag that deploys from a side panel may, when inflated, be disposed between a vehicle occupant's outboard lower leg and the A-pillar, thereby cushioning the occupant's lower leg from the full impact of striking the A-pillar during a collision event.

In the absence of a knee airbag that deploys from a side panel, a lower leg of an occupant may be exposed to greater risk of injury during a collision. In the case of a collision that causes occupant movement in a forward and outboard direction, a lower leg of an occupant may slide off of or otherwise fail to engage with a traditional knee airbag during a collision event, thereby causing the lower leg to strike the A-pillar or another hard surface of the vehicle. Also, during a collision in which a front-seat occupant travels in both a forward and outboard direction, the A-pillar (or other structure of the vehicle) may intrude to a greater extent into an occupant interior space. In other words, vehicle structure(s), such as the A-pillar may encroach more significantly into the occupant interior space, which may pose greater risk of injury to, for example, a lower leg of an occupant. Thus, airbag assemblies that include an airbag cushion that is configured to cover the region between the occupant and the A-pillar may provide increased protection to a front-seat occupant relative to vehicles lacking such an airbag cushion, especially during collisions in which a front-seat occupant travels in both a forward and outboard direction. Other advantages of various embodiments will be evident from the present disclosure.

An occupant's forward and outboard trajectory may arise from frontal-impact collisions where the impact is not distributed uniformly across the front plane of the vehicle. Such collisions may be, for example, (1) vehicle-to-vehicle collisions in which, immediately prior to impact, the occupant's vehicle is travelling in a direction that is not substantially parallel to the other vehicle's direction of travel, (2) vehicle-to-vehicle collisions where, immediately prior to impact, both vehicles are travelling in substantially parallel directions, or (3) collisions with a stationary object.

Some embodiments disclosed herein can provide improved positioning, cushioning, and/or safety to occupants involved in particular types of collisions. For example, some embodiments can be particularly suited to cushion drivers and/or front-seat passengers seated adjacent a front door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, and (6) collisions as specified for the National Highway Traffic Safety Administration (NHTSA) left oblique impact test. The conditions for the IIHS small overlap front crash test and the NHTSA oblique impact test are disclosed in the Insurance Institute for Highway Safety, Small Overlap Frontal Crashworthiness Evaluation Crash Test Protocol (Version II) (Dec. 2012) and Saunders, J., Craig, M., and Parent, D., Moving Deformable Barrier Test Procedure for Evaluating Small Overlap/Oblique Crashes, SAE Int. J. Commer. Veh. 5(1): 172-195 (2012).

Figure 2:
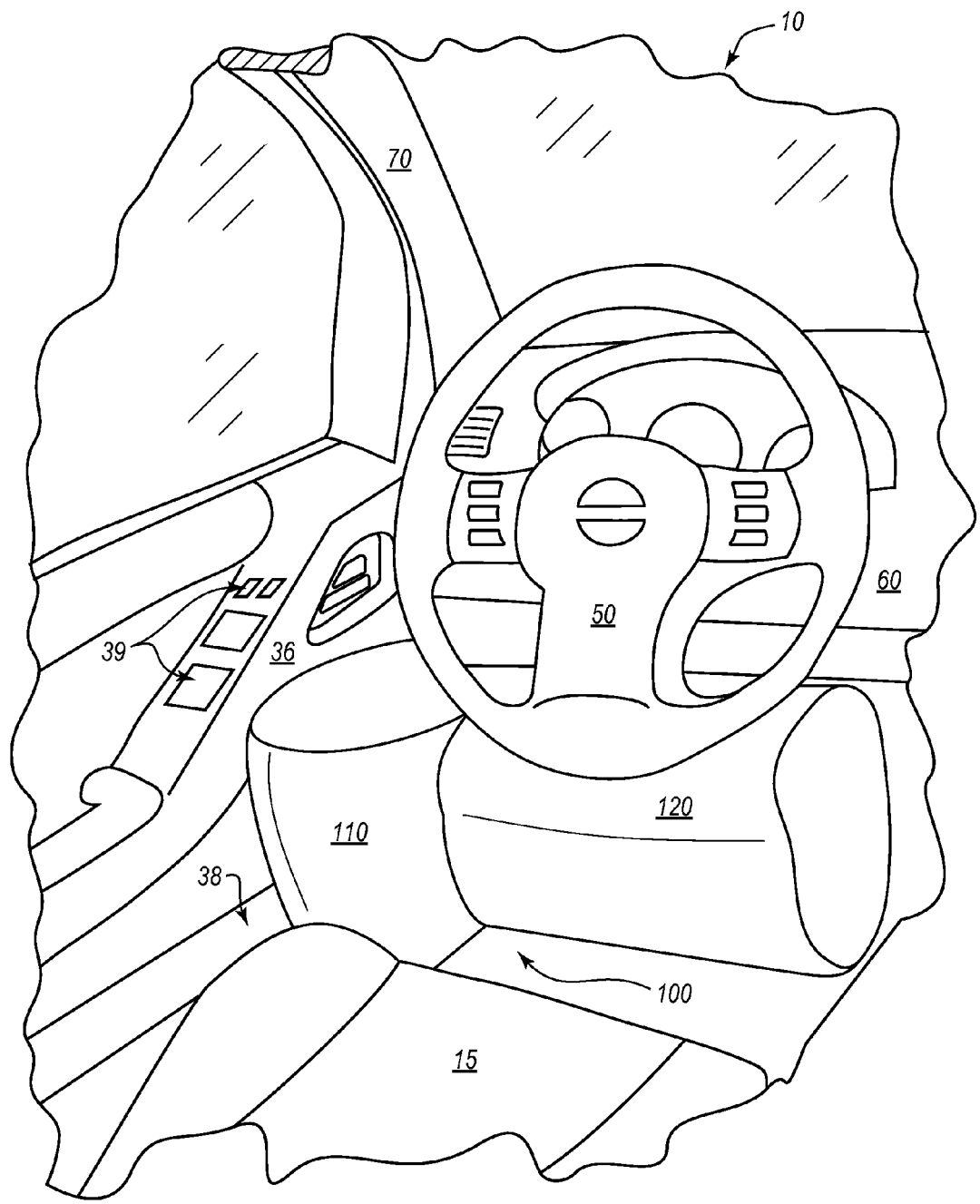
FIG. 2 is a perspective view of the portion of the interior of the vehicle shown in FIG. 1 with the airbag assembly in a deployed state.
Figure 3:
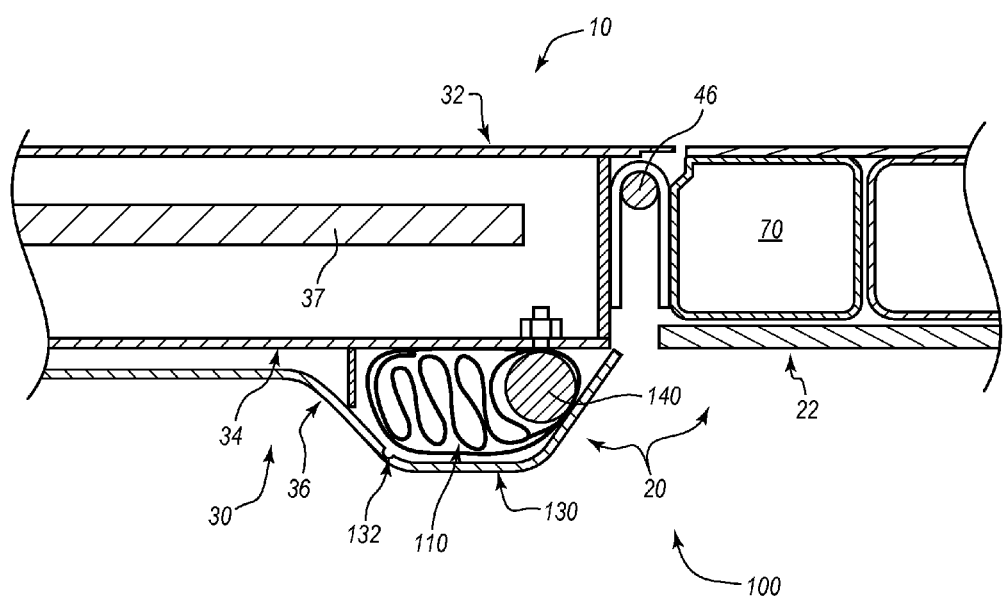
FIG. 3 is a cross-sectional top view through line 3-3 of a side panel of the vehicle of FIG. 1 with the airbag assembly in an undeployed state.
Figure 4:
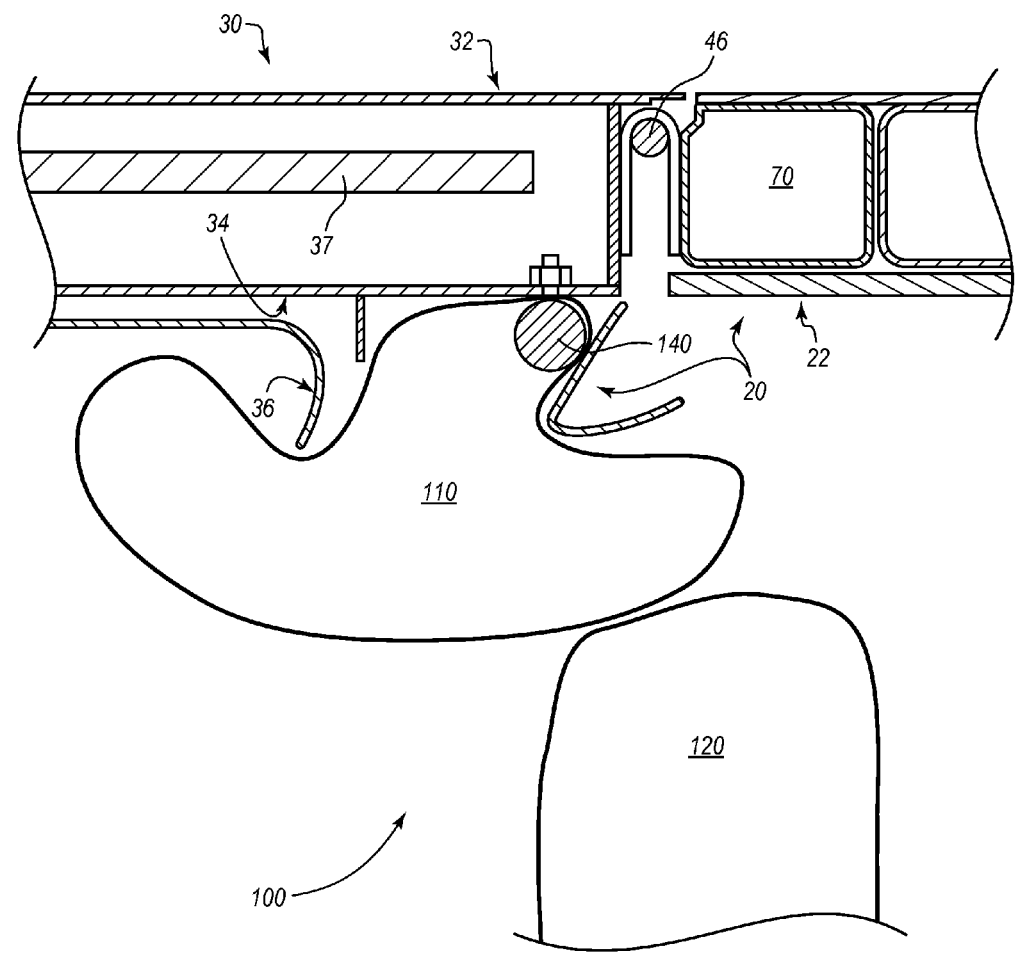
FIG. 4 is a cross-sectional top view through line 3-3 of the side panel of the vehicle of FIG. 1 with the airbag assembly in a deployed state.
Figure 5:
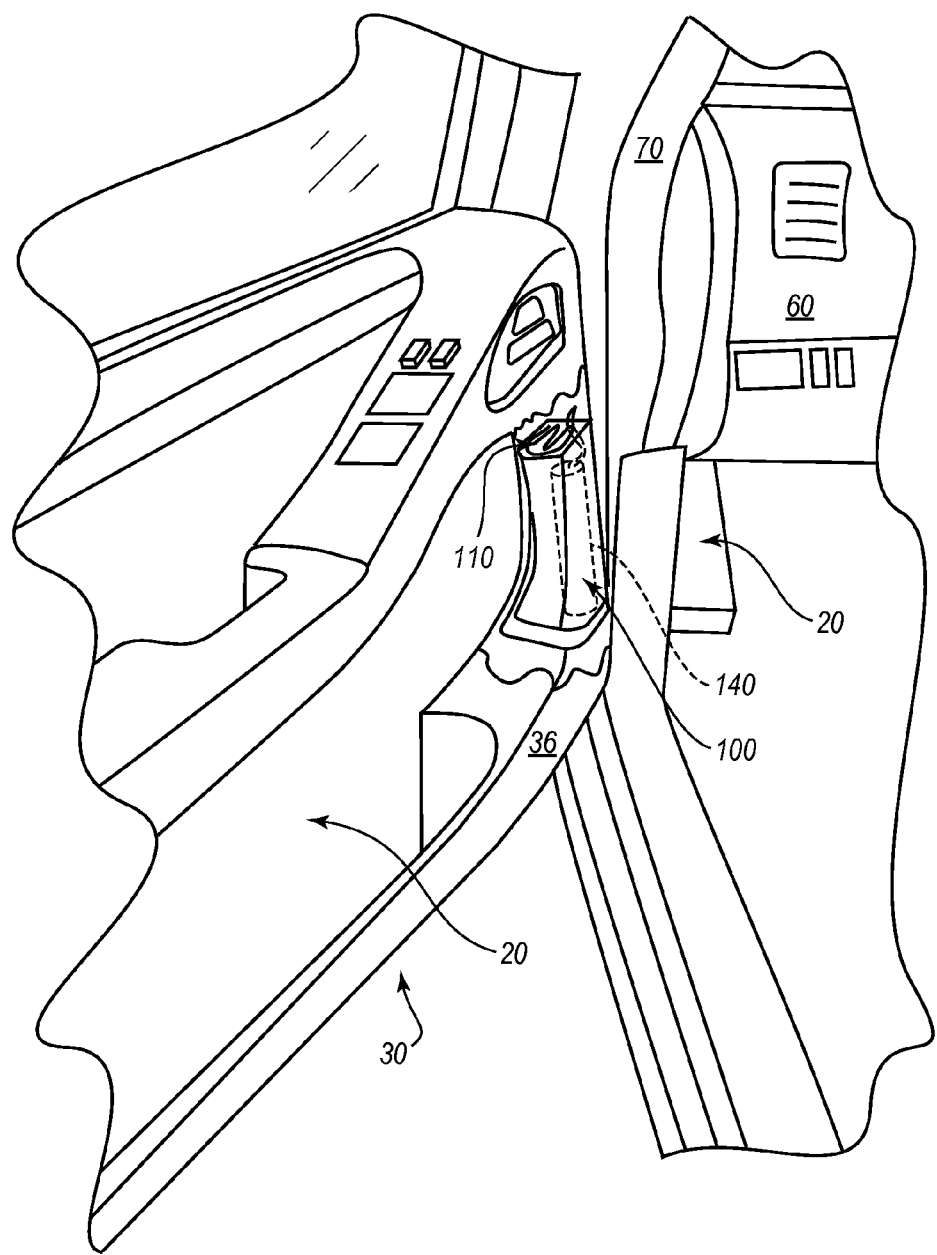
FIG. 5 is a partially cut-away perspective view of the undeployed airbag assembly of FIG. 1 and a front portion of a vehicle with the door ajar.

FIGS. 1-5 provide views of portions of a vehicle 10 with an airbag assembly 100 that is configured to be deployed from a side panel 20 of the vehicle 10. In particular, FIGS. 1 and 2 provide perspective views of a front-left interior portion of the vehicle 10 with the airbag assembly 100 in a undeployed state (FIG. 1) and a deployed state (FIG. 2). FIGS. 3 and 4 provide a cross-sectional top view of the side panel 20 and the first airbag cushion 110 of FIG. 1, with the first airbag cushion 110 in an undeployed state (FIG. 3) and a deployed state (FIG. 4). FIG. 5 provides a partially cut-away perspective view of the airbag assembly 100 in an undeployed state where the door 30 is ajar and a portion of the interior trim 36 of the door 30 has been removed to expose the location of a folded airbag cushion 110 and an inflator 140. Although FIGS. 1-5 depict an airbag assembly 100 disposed in a front-left interior portion of the vehicle 10, similar airbag assemblies may be disposed at other locations in a vehicle as well, such as airbag assemblies that are configured to deploy from a passenger-side side panel of a vehicle.

With reference to FIGS. 1-2, the vehicle 10 may include a front seat 15, a steering wheel 50, a dashboard 60, and a side panel 20. The steering wheel 50 may be disposed forward of the seat 15 and attached to the dashboard 60 via a steering column. The side panel 20 may include a door 30 and a region 22 disposed forward of the door 30. The door 30 may include interior trim 36, a storage compartment 38, and controls 39. The region 22 disposed forward of the door 30 may include an A-pillar 70 and other components of the vehicle frame, along with interior trim attached to the frame.

As can be observed in FIG. 2, an airbag assembly 100 may be disposed within the vehicle 10 and, when inflated, may cushion one or more lower legs of a front-seat occupant during a collision event. The airbag assembly 100 may include one or more airbag cushions, such as a first airbag cushion 110 that is configured to deploy from a side panel 20 of the vehicle 10. In some embodiments, the airbag assembly 100 may also include a second airbag cushion 120 that is configured to deploy in a generally downward direction from the steering column or dashboard 60.

The first airbag cushion 110, when fully deployed, may be disposed entirely below the chest and/or shoulder of a front-seat occupant (e.g., a crash test dummy such as the THOR Advanced Crash Test Dummy) if the occupant is seated in the vehicle occupant position. In some embodiments, the geometric center of the first airbag cushion 110, when the airbag cushion 110 is fully inflated, is disposed lower than an upper surface of the front seat 15 (i.e., the portion of the seat 15 configured to contact the thigh and buttocks of the occupant when the occupant is seated in the vehicle occupant position). In some embodiments, the first airbag cushion 110, when fully inflated, is disposed such that the airbag cushion 110 is situated to cushion a lower leg, but not the waist, torso, or shoulder of the front-seat occupant during a collision event in which the occupant travels in a forward and outboard direction.

In some embodiments and circumstances, the first airbag cushion 110 is deployed during the same collision event as a second airbag cushion 120 that deploys in a generally downward direction from a steering column or a dashboard 60. The first airbag cushion 110 and the second airbag cushion 120 may contact one another when fully deployed. Such contact may help orient the airbag cushions 110, 120 for receiving the occupant during the collision event.

As noted above, FIGS. 3 and 4 provide cross-sectional views of a portion of the vehicle 10 through line 3-3 of FIG. 1. More specifically, FIG. 3 provides a cross-sectional view of a portion of the vehicle 10 prior to deployment of the airbag assembly 100, while FIG. 4 provides the same cross-sectional view with the airbag assembly 100 in a fully deployed state.

As depicted in FIGS. 3 and 4, the vehicle 10 may comprise a door 30 and a region disposed forward of the door 22. The door 30 may comprise an exterior skin 32 that faces the outside of the vehicle 10, an interior skin 34 that faces the interior of the vehicle 10, a guide rail 37 for a door window, and an interior trim 36. The interior trim 36 of the door 30 may be disposed generally inboard of the interior skin 34 of the door 30. The door 30 may swing about a hinge 46. The region disposed forward of the door 22 may comprise an A-pillar 70.

The airbag assembly 100 may be configured to deploy within the vehicle 10. The airbag assembly 100 may comprise a first airbag cushion 110, a second airbag cushion 120, an airbag housing 130, and/or an inflator 140. As depicted in FIGS. 3 and 4, the first airbag cushion 110 may be configured to deploy from a side panel 20 of the vehicle 10. The second airbag cushion 120 (shown in FIG. 4), which is not in fluid communication with the first airbag cushion 110, may be configured to deploy from a steering column or dashboard of the vehicle 10. The airbag housing 130 may be attached (e.g., mounted) to, integrated with, and/or disposed within a portion of a side panel 20 of the vehicle 10, such as a side door 30 or the region 22 of the side panel 20 disposed forward of the side front door 30. For instance, the first airbag cushion 110 may be disposed between the interior trim 36 and the interior skin 34 of the door 30. Stated differently, the interior skin 34 and the interior trim 36 of the door 30 may, at least in part, form a housing 130 for the first airbag cushion 110. An inflator 140 may also be disposed between the interior skin 34 and the interior trim 36. For example, an inflator 140 may be mounted (e.g., bolted) to the interior skin 34 and release inflation gas in response to one or more sensors. Such sensor(s) may detect that the impact of a collision event is not uniformly distributed across a front plane of the vehicle 10. Release of inflation gas from the inflator 140 may cause the first airbag cushion 110 to expand and exit from the housing 130. The interior trim 36 of the door 30 may include a tear seam 132 to facilitate deployment from the housing 130. In some embodiments, the housing 130 is disposed forward of a knee of a front-seat occupant when the front-seat occupant is seated in the vehicle occupant position.

During a collision event, one or more sensors may trigger the release of gas from one or more inflators 140 to fill one or more airbag cushions 110, 120. The airbag cushions 110 and 120, when deployed, may be positioned to cushion the lower leg of a front-seat occupant. More particularly, the first airbag cushion 110 may be configured to receive inflation gas from an inflator 140 to expand the first airbag cushion 110 from a compact state within the housing 130 to a deployed state. Such inflation may cause the first airbag cushion 110 to deploy inboard of a housing 130 and cover a region disposed between the occupant's outboard lower leg and the A-pillar 70, thereby cushioning a lower leg of the front-seat occupant during a collision event. For example, the first airbag cushion 110 may deploy from a side panel 20 of the vehicle 10 to occupy a region disposed between the A-pillar 70 and the vehicle occupant position. In some embodiments, the geometric center of the first airbag cushion 110, when fully deployed, is disposed inboard and/or rearward of its inflator 140 and/or the housing 130 from which it deploys. A first airbag cushion 110 deploys in a generally inboard direction from the side panel 30 may cushion the lower outboard leg of a front-seat occupant during a collision event in which the front-seat occupant moves in a forward and outboard direction.

An airbag assembly 100 that comprises a first airbag cushion 110 that deploys from a side panel 20 of a vehicle 10 may provide one or more advantages over other airbag assemblies. For example, in the absence of a first airbag cushion 110 that deploys from a side panel of a vehicle, it may be difficult to deploy an airbag cushion in the space between an outboard leg of a front-seat occupant and the intruding vehicle structure during some small overlap collision events. During such collision events, the vehicle 10 may deform such that the vehicle structure intrudes into an area previously included within the cabin of the vehicle.

Because (1) the occupant often continues to move forward as the structure begins to intrude toward the occupant and/or (2) the vehicle 10 tends to rotate around the point of impact during such collision events, it may be difficult to deploy a traditional knee airbag (i.e., an airbag that deploys from a steering column or the dashboard 60) such that the airbag cushion of the traditional knee airbag quickly occupies the region between the outboard leg of the vehicle occupant and the intruding structure.

A first airbag cushion 110 that deploys from a side panel 20 of a vehicle 10 may protect a vehicle occupant from this intruding structure. Stated differently, a first airbag cushion 110 that is coupled to (e.g., attached or mounted to) a side panel 20 of a vehicle 10 may, when deployed during a collision event, occupy a region of space between the outboard lower leg of the vehicle occupant and the intruding structure. Such deployment may provide an inflated airbag cushion (e.g., first airbag cushion 110) between the lower leg of a vehicle occupant and the intruding structure in a more reliable fashion and/or more quickly than an airbag cushion that deploys from a steering column or dashboard 60.

FIG. 5 is a partially cut-away perspective view of the undeployed airbag assembly 100 of FIG. 1 and a front portion of a vehicle with the door 30 ajar. FIG. 5 illustrates the first airbag cushion 110 in a compressed state and the inflator 140 within the side panel 20 and within the interior trim 36 of the door 30. The A-pillar 70 and dashboard 60 are viewable for context.

Although the embodiments depicted in FIGS. 1-5 depict an airbag cushion 110 that deploys from a door 30, in other embodiments, an analogous airbag cushion may deploy from a region 22 of a side panel 20 that is disposed forward of a front door 30. For example, an airbag cushion may deploy from a housing that is attached to, integrated with, and/or disposed in a region 22 of the side panel 20 that is disposed forward of the front door 30. More particularly, an airbag cushion may deploy from an airbag housing that is mounted to the side panel 20 just forward of the A-pillar 70. The airbag cushion may deploy inboard of the housing to cushion a lower leg of a front-seat occupant. In some embodiments, an analogous airbag cushion may deploy from a passenger-side side panel of a vehicle.

Figure 6:
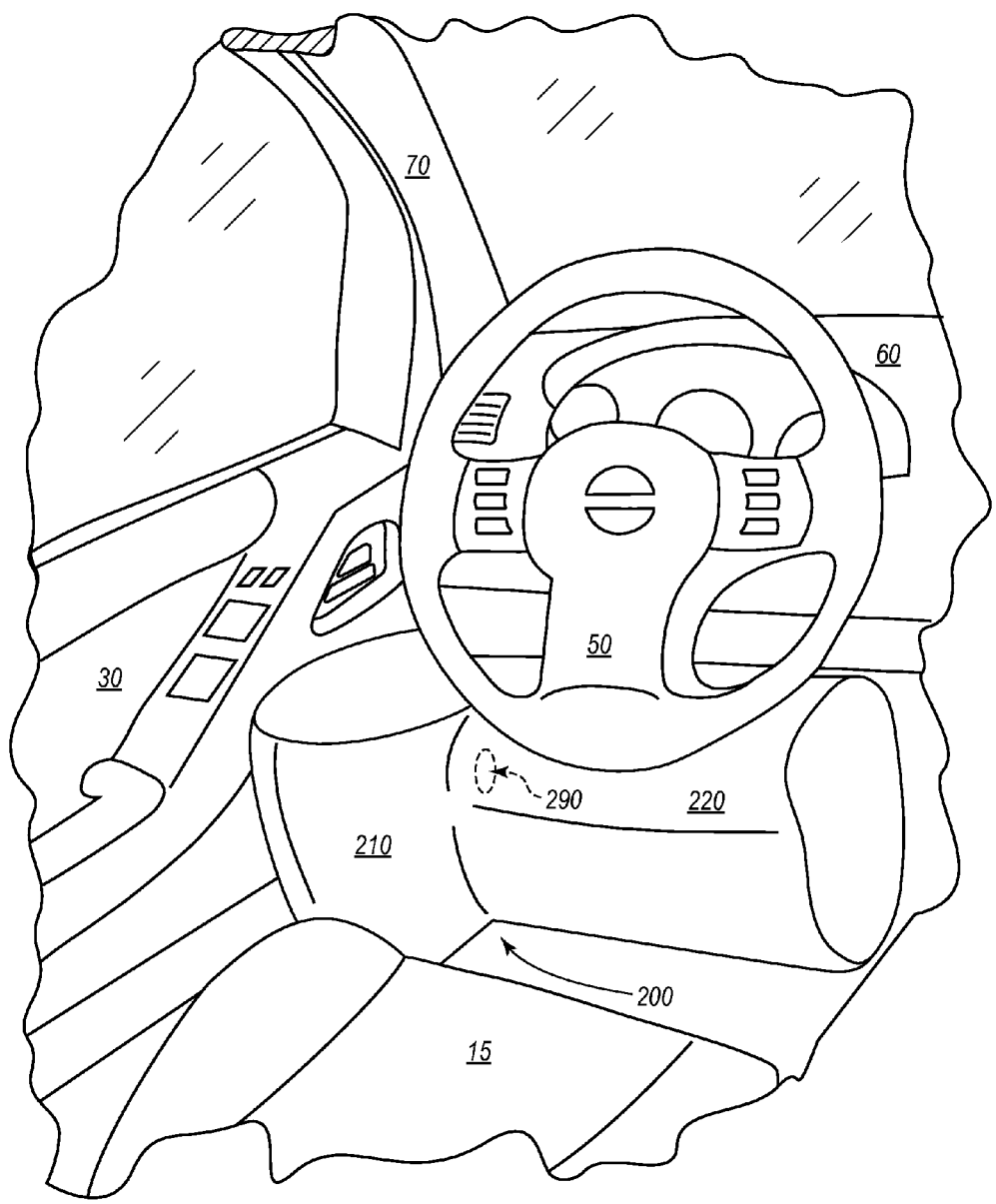
FIG. 6 is a perspective view of a deployed airbag assembly according to another embodiment.

FIG. 6 depicts an embodiment of an airbag assembly 200 that resembles the airbag assembly 100 described above in certain respects. Accordingly, like features are designated with like reference numerals, with the leading digits incremented to "2." For example, the embodiment depicted in FIG. 6 includes a first airbag cushion 210 that may, in some respects, resemble the first airbag cushion 110 of FIGS. 1-5. Relevant disclosure set forth above regarding similarly identified features thus may not be repeated hereafter. Moreover, specific features of airbag assemblies and related components shown in FIGS. 1-5 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 200 and related components depicted in FIG. 6. Any suitable combination of the features, and variations of the same, described with respect to the airbag assembly 100 and related components illustrated in FIGS. 1-5 can be employed with the airbag assembly 200 and related components of FIG. 6, and vice versa. This pattern of disclosure applies equally to further embodiments depicted in subsequent figures and described hereafter, wherein the leading digits may be further incremented.

The airbag assembly 200 may include a first airbag cushion 210 that is disposed outboard of a second airbag cushion 220 when the airbag assembly 200 is in a deployed state. In the embodiment depicted in FIG. 6, the first airbag cushion 210 and the second airbag cushion 220 are in fluid communication with one another. The first airbag cushion 210 may be configured to cushion the lower outboard leg of a front-seat occupant when the front-seat occupant moves in a forward and outboard direction during a collision event. The second airbag cushion 220 may be configured to cushion the lower legs of a front-seat occupant during a collision event where the occupant moves in a directly forward direction.

In the depicted embodiment, the first airbag cushion 210 and the second airbag cushion 220 each adopt a distinct three-dimensional shape when in a deployed state. More particularly, in the depicted embodiment, the first airbag cushion 210 extends further rearward than the second airbag cushion 220.

The first airbag cushion 210 and the second airbag cushion 220 may be arranged in any suitable manner to provide fluid communication between the airbag cushions 210, 220. For example, the first airbag cushion 210 and the second airbag cushion 220 may be coupled to one another (e.g., via stitching, adhesive, taping, radio frequency welding, or heat sealing) to provide a passageway between the airbag cushions 210, 220. As depicted in FIG. 6, one or more vents 290 may be positioned between the first airbag cushion 210 and the second airbag cushion 220 to provide direct fluid communication between the chambers of the airbag cushions 210, 220. In other embodiments, the first airbag cushion and second airbag cushion are formed from a unitary piece of material that allows air to travel from the first airbag cushion to the second airbag cushion.

The airbag cushions 210 and 220 may be stored in a compact state in a housing and deploy inboard from a side panel 20 of a vehicle 10. For example, during a collision event, one or more sensors may trigger an inflator, causing the inflator to release inflation gas. The first airbag cushion 210 may be directly attached to the inflator. Due to the presence of a passageway that places the first airbag cushion 210 in fluid communication with the second airbag cushion 220, both the first airbag cushion 210 and second airbag cushion 220 may expand as inflation gas is released from the inflator. Such expansion may cause the second airbag cushion 220 to extend generally inboard of the first airbag cushion 210. The airbag assembly 200 may thus provide cushioning for one or more lower legs of a front-seat occupant in both (1) collisions where the occupant moves in both a forward and an outboard direction and (2) collisions in which the occupant moves in a forward (but not an outboard) direction.

Figure 7:
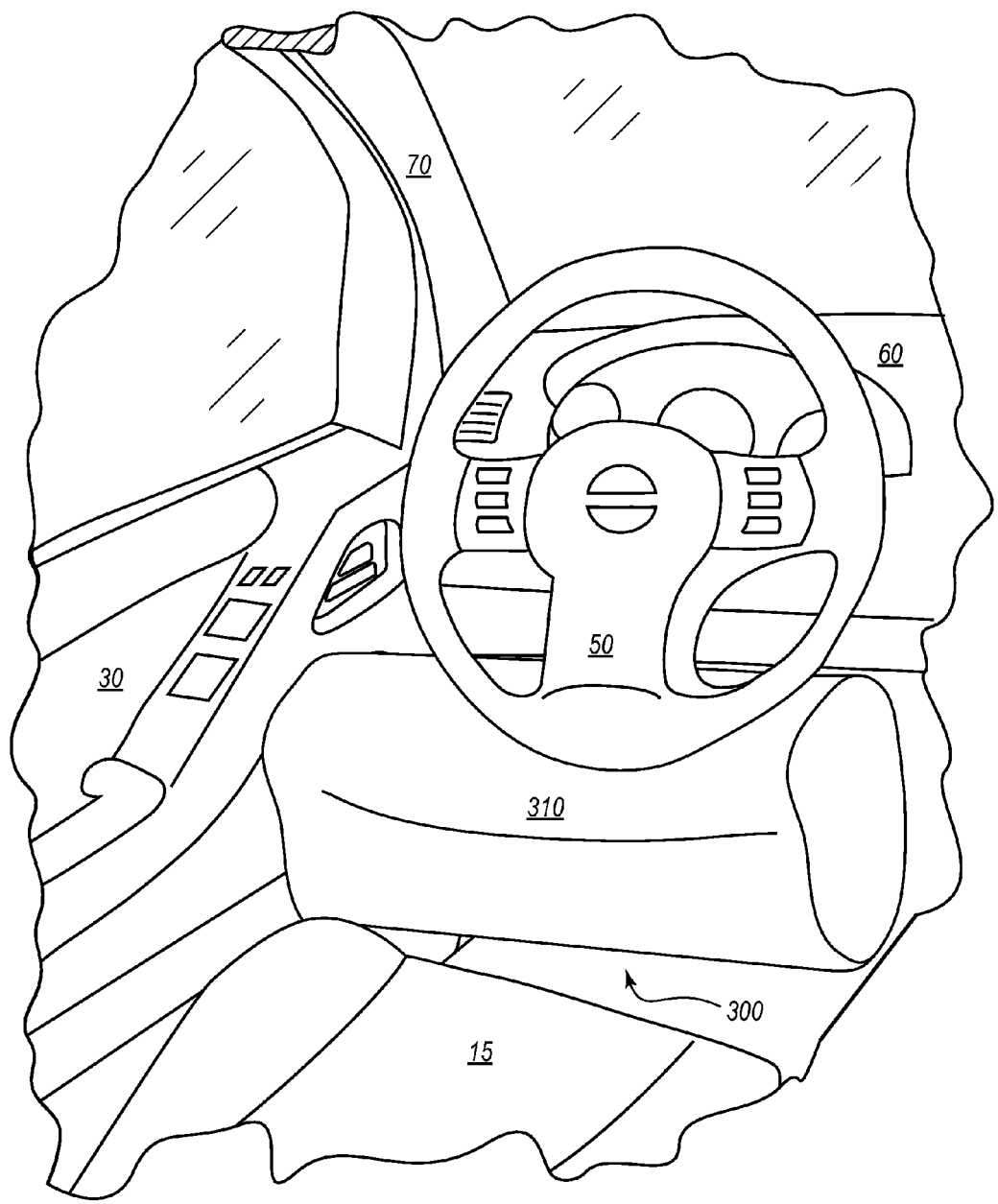
FIG. 7 is a perspective view of a deployed airbag assembly according to another embodiment.

FIG. 7 provides a perspective view of an airbag assembly 300. The airbag assembly 300 includes an airbag cushion 310 that is configured to extend from a side panel 20 of the vehicle 10. When deployed, the airbag cushion 310 is positioned to cushion both an outboard and inboard leg of a front-seat occupant when the occupant moves in a generally forward direction during the collision event. In contrast to airbag assembly 200 as shown in FIG. 6, the airbag assembly 300 does not include a first airbag cushion that extends further rearward than a second airbag cushion. The airbag cushion 310 may substitute for a knee airbag cushion that deploys from a steering column or dashboard 60 of a vehicle 10.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure, that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

The invention claimed is:

1. A knee airbag assembly comprising:
   a housing configured to be mounted to or disposed within a side panel of a vehicle;
   an inflator;
   a first airbag cushion that is configured to receive inflation gas from the inflator to expand the first airbag cushion from a compact state within the housing to a deployed state and to deploy inboard of the housing and the side panel to cushion a front side of an outboard lower leg of a front-seat occupant during a collision event in which the front-seat occupant moves in a forward and outboard direction; and
   a second airbag cushion in fluid communication with the first airbag cushion, wherein the second airbag cushion is configured to extend inboard of the first airbag cushion to cushion a front of a leg of the front-seat occupant during a collision event in which the front-seat occupant moves in a directly forward direction.

2. The knee airbag assembly of claim 1, wherein the first airbag cushion, when fully deployed, is disposed between a vehicle occupant position and an A-pillar of the vehicle.

3. The knee airbag assembly of claim 1, wherein the first airbag cushion is not configured to contact a waist, torso, or shoulder of the front-seat occupant during the collision event.

4. The knee airbag assembly of claim 1, wherein the housing is disposed forward of a knee position of the front-seat occupant when the front-seat occupant is seated in a vehicle occupant position and the front-seat occupant has the size of a 50th percentile male crash test dummy.

5. The knee airbag assembly of claim 1, wherein the housing is disposed adjacent a hinge of a side front door of the vehicle.

6. The knee airbag assembly of claim 1, wherein the first airbag cushion, when fully deployed, has a geometric center that is inboard and rearward of the inflator.

7. The knee airbag assembly of claim 1, wherein the first airbag cushion is deployed in response to a sensor that detects that an impact from the collision event is not uniformly distributed across a front plane of the vehicle.

8. The knee airbag assembly of claim 1, wherein the housing is configured to be mounted to or disposed within a side front door of the vehicle.

9. The knee airbag assembly of claim 1, wherein the housing is configured to be mounted to or disposed within a region of the side panel that is disposed forward of a side front door.

10. The knee airbag assembly of claim 1, wherein the second airbag cushion is configured to cushion the outboard and inboard legs of the front-seat occupant during a collision event in which the front-seat occupant moves in a forward but not outboard direction.

11. The knee airbag assembly of claim 1, wherein the knee airbag assembly is configured to be deployed from a driver side of the vehicle.

12. The knee airbag assembly of claim 1, wherein the knee airbag assembly is configured to be deployed from a passenger side of the vehicle.

13. A knee airbag assembly comprising:
a housing mountable within a side panel of a vehicle;
an inflator; and
an airbag in fluid communication with the inflator, the airbag configured to receive inflation gas to expand from a compact state within the housing to deploy inboard of the housing and the side panel to cushion a front side of both an outboard lower leg and an inboard lower leg of a front-seat occupant during a collision event in which the occupant moves in a directly forward direction.

14. The knee airbag assembly of claim 13, wherein the airbag comprises:
a first airbag cushion configured to be disposed, in a deployed state, between a vehicle occupant position and an A-pillar of the vehicle.

15. The knee airbag assembly of claim 13, wherein the airbag is not configured to contact a waist, torso, or shoulder of the front-seat occupant during the collision event.

16. The knee airbag assembly of claim 13, wherein the knee airbag assembly is configured to be deployed from a driver side of the vehicle.

17. A knee airbag assembly comprising:
a housing disposed within a side panel of a vehicle; and
a first airbag cushion disposed within the housing;
wherein the first airbag cushion is configured to deploy inboard from the housing to cushion a front side of both an outboard lower leg and an inboard lower leg of a front-seat occupant during a collision event in which the occupant moves in a directly forward direction.

18. The knee airbag assembly of claim 17, wherein the first airbag cushion is not configured to contact a waist, torso, or shoulder of the front-seat occupant during the collision event.

19. The knee airbag assembly of claim 17, wherein the knee airbag assembly is configured to be deployed from a driver side of the vehicle.

20. The knee airbag assembly of claim 17, wherein the first airbag cushion is deployed in response to a sensor that detects that an impact from the collision event is not uniformly distributed across a front plane of the vehicle.

* * * * *